May 22, 1951 P. W. MORRISSEY 2,554,416
ADJUSTABLE GRAIN SEPARATOR SIEVE SECTION
Filed Sept. 27, 1946

Inventor:
Patrick W. Morrissey,
By Soans, Pond & Anderson
Attorneys.

Patented May 22, 1951

2,554,416

UNITED STATES PATENT OFFICE 2,554,416

ADJUSTABLE GRAIN SEPARATOR SIEVE SECTION

Patrick W. Morrissey, Racine, Wis., assignor to J. I. Case Company, a corporation of Wisconsin Application September 27, 1946, Serial No. 699,803

2 Claims. (Cl. 209—394)

My invention relates to improvements in the slat-like grain sieve sections which are used in the adjustable grain sieves or chaffers embodied in various types of harvesters, threshers, and separators.

In such machines of present construction the final separation of grain or seeds from the chaff and such straw as may be still mixed with the grain is effected by means of sieves which comprise a plurality of pivotally supported, generally parallel slat sections. Currents of air are passed upwardly through the sieve, the air flowing between the slat sections so as to carry away the chaff and straw and allow the relatively streamlined kernels of grain to fall through the sieve whence they are conveyed to a hopper or bin. One of the difficult problems in this art is the provision of sieve sections that will allow even distribution of the air currents over the entire sieve and will withstand the severe service to which the sieves are subjected.

My investigations have shown that it is desirable in a grain separator sieve to have sections which will cause uniform velocity air currents to pass between all of the sieve sections and at the same time will provide smooth chutes for the falling grain. The separation is more efficiently effected if the air is broken up into turbulent eddies which tend to tear some of the partially attached chaff from the grain kernels.

The principal object of this invention is to provide a rigid, non-warping sieve section which will operate in the above described manner.

Another object is to provide a sieve section which will not clog during use so as to prevent the air from passing through.

Further objects and advantages of the invention will be understood by reference to the following specification and the accompanying drawings, wherein is illustrated the preferred embodiment of my invention.

Figure 1:
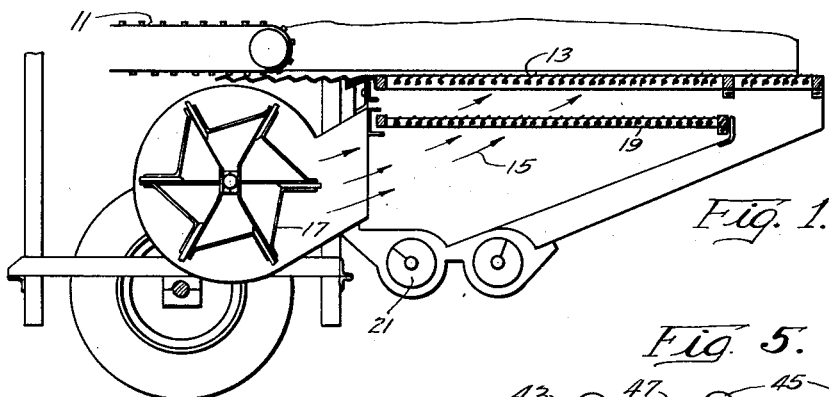
Fig. 1 shows a fragmentary cross-sectional view of the separator portion of a conventional threshing device.

In Fig. 1 there is shown a fragmentary sectional view of the grain separator in a conventional combined harvester, thresher and separator. The grain and chaff pass from the threshing cylinder (not shown) to a grain conveyor 11 which deposits the grain upon the adjustable chaffer sieve 13. A blast of air indicated by arrows 15 is forced from the blower 17 through the grain cleaning sieve 19, whence it passes through the chaffer sieve 13. The grain falls through each of the sieves in succession and is carried away by the grain auger 21. The chaff is carried out with the air blast in conventional manner.

As previously stated, the grain cleaning sieves, including the chaffers, are composed of a plurality of generally parallel sieve or slat sections 23. To each section there is rigidly attached a rod 25 which provides a shaft on which the section is hinged or pivoted. One extended end of the rod 25 is shaped so as to form a crank arm 27 by means of which the sieve sections are moved simultaneously in a parallel relation.

Figure 2:
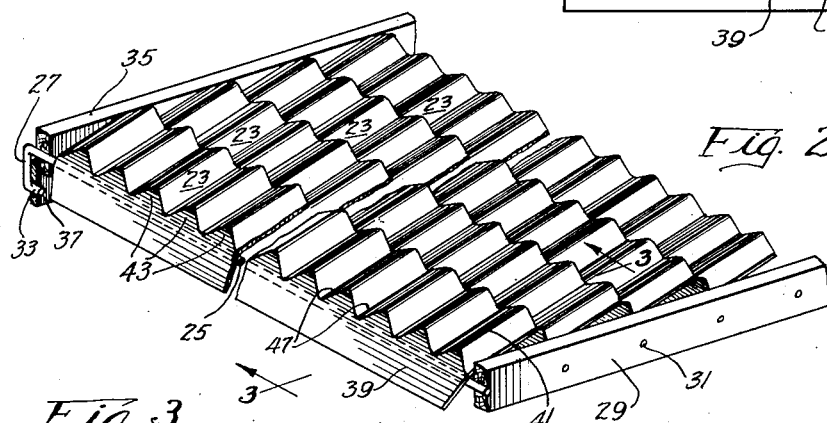
Fig. 2 is a fragmentary isometric view showing the preferred method of mounting the sieve sections of the present invention to provide an adjustable grain sieve.

The installation of the sieve sections 23 in a frame to form an adjustable grain sieve is shown in Fig. 2. One end of the rod or shaft 25 extends outward from each of the sections and is fitted into a drilled hole 31 in a permanent wood frame 29 thereby providing one bearing for the sieve section. The other extension of the shaft 25 is clamped in a drilled hole in a split portion of the frame 35 to form the other bearing for the sieve section. The crank arm 27 provided by the extended portion of the shaft extends beyond the frame 35, and the crank 33 is journalled into the adjusting bar 37. The cranks from a plurality of sieve sections are equally spaced along the adjusting bar so as to maintain a parallel relation between the sieve sections and thus insure air passageways of uniform width. The adjusting bar 37 may be moved longitudinally so that the width of the air passageways may be varied in size, thus controlling the velocity of the air currents and allowing the sieve to be adjusted to process grains of varying dimensions and densities.

The sieve sections constructed in accordance with this invention are sheet metal stampings, which are rectangular in outline and which preferably are manufactured of galvanized sheet iron. Each of the sieve sections has a length which is several times its width and is defined by two portions or surfaces extending lengthwise of the section and arranged at an angle of about 135°.

One of these surfaces, the air deflecting surface 39, is plane, and the other surface, the grain chute surface 41, is corrugated, having ridges 45 and channels 47 assuring the unimpeded flow of grain. The chute surface 41 and the deflecting surface 39 merge smoothly with each other along a line coincident with the line of intersection between the two surfaces, and the deflecting surface 39 extends to form crowns 43 which seal the ends of the ridges 45. A sheet of metal stamped in the shape described becomes a rigid, dimensionally stable section because of the interbracing effect of the crowns 43 at the junction of the air deflecting surface 39 and the corrugated chute surface 41.

Figure 5:
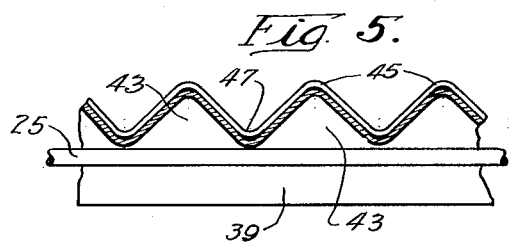
Fig. 5 is a cross-sectional detail taken on the line 5—5 of Fig. 4.

Each of the supporting shafts 25 is attached to the under side of the air deflecting surface 39 of the associated sieve section, preferably by welding. The sections are welded to the shaft rods in a position that allows the crown 43 of the chute surfaces 41 to interlock with the channels 47 of the adjoining chute section (Fig. 5) and thus effectively closes the sieve when the controlling bar 37 is moved to sieve closing position. As the controlling bar is moved to the open position (Fig. 3) the sieve sections maintain a parallel relation and allow a uniform flow of air across the screen.

Figure 3:
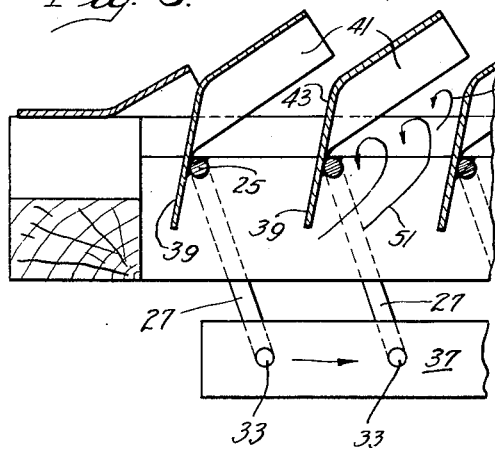
Fig. 3 is an enlarged, sectional view taken on line 3—3 of Fig. 2 and showing the sieve sections in an open position.
Figure 4:
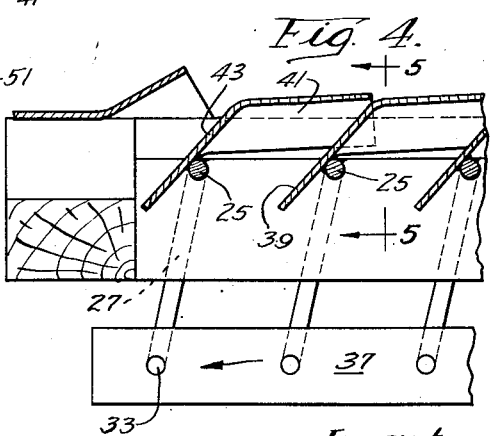
Fig. 4 is also an enlarged, sectional view. This view shows the sieve sections in their fully closed position.

Arrows 51, in Fig. 3, show the turbulent air flow condition that is effected by the air deflecting surface. These turbulent air currents materially increase the efficiency of separation of partially free chaff from the grain and permit maximum reduction in the length of the chute surface, thus allowing the manufacture of a more compact separator unit. The sieve sections now in use require chute surfaces that are about two and a half inches long to effect the same degree of separation that can be accomplished in a unit employing the air deflector principle of applicant's invention, that is only an inch and a quarter long. The reduction in size of the separator section is particularly advantageous in making possible the manufacture of compact, highly efficient grain separators for small sized combined harvesters and threshers.

The development of this sieve section has resulted in many other advantages. The bearing shaft or rod is attached to the under side of the plane air deflector face instead of directly to the corrugations, thus eliminating the possibility of straw clogging the sieve by sticking in the spaces between the bearing rod and the corrugations of the section. The grain is allowed to roll down the smooth channels in the chute surface and down the plane deflector face without encountering any pockets of stationary grain which if formed would cause some of the light grain kernels to blow out with the chaff. Further, as an inherent feature of a sieve section in accordance with the invention, there are no pockets or projections which tend to catch straw on the lower side of the sieve section. Thus, the improved sieve is substantially free from any tendency to choke or clog during use.

The features of my invention that I believe to be new are expressly set forth in the following claims.

I claim:

1. A sieve section for grain separator sieves and the like, said section comprising an elongated strip of sheet material, said strip being rectangular in outline and consisting of two integrally joined portions disposed at an angle of substantially 135° relatively to each other and which extend lengthwise of said strip, one of said portions defining a corrugated grain chute surface having alternate ridges and channels, and the other being flat and defining a plane air deflector surface, said chute surface and said deflector surface merging smoothly with each other along a line coincident with the line of intersection between the two surfaces, said channels being of uniform cross-section from the uppermost point of intersection with said plane air deflector surface to the edge of said corrugated grain chute surface remote from said point of intersection, and an axially straight bearing rod which extends along, and is in straight-line continuous and uninterrupted contact with the underside of said plane air deflector portion and at the point of merger of the channel portions with the air deflector portion whereby to avoid the formation of trash engaging apertures between the undersides of said ridges and said bearing rods, said rod being bonded to said air deflector portion.

2. In a grain sieve for separators, the combination of a frame having a movable adjusting portion, and a plurality of sieve sections, each of said sieve sections comprising an elongated strip of sheet material, which is rectangular in outline and which consists of two integrally joined portions, disposed at an angle of substantially 135° relatively to each other and extending lengthwise of said strip, one of said portions defining a corrugated grain chute surface having alternate ridges and channels, and the other being flat and defining a plane, air deflector surface, said chute surface and said deflector surface merging smoothly with each other along a line coincident with the line of intersection between the two surfaces, said channels being of uniform cross-section from the uppermost point of intersection with said plane air deflector surface to the edge of said corrugated grain chute surface remote from said point of intersection, and an axially straight bearing rod which extends along and is in straight-line continuous and uninterrupted contact with the underside of said plane air deflector portion and at the point of merger of the channel portions with the air deflector portion, whereby to avoid the formation of trash engaging apertures between the undersides of said ridges and said bearing rods, each of said bearing rods being bonded to the air deflector portion with which it is associated adjacent the line of intersection of the chute portion with the air deflector portion thereof, each of said bearing rods having an extended portion on one end which is journaled into said frame and an extended portion on the other end thereof, which is formed into a crank arm, said crank arms being journaled into the movable adjusting portion of said frame and being operable to adjust simultaneously the angle of said sieve sections, and said sieve sections being movable from an extreme closed position, wherein the exposed longitudinal edge of each of the chute surfaces engages the ridges and channels of the adjacent sieve section to close the sieve substantially completely, to an extreme open position, wherein the exposed longitudinal edge of each of the chute surfaces is spaced a substantial distance from the ridges and channels of the adjacent sieve section.

PATRICK W. MORRISSEY.

(References on following page)

REFERENCES CITED

The following references are of record in the file of this patent:

UNITED STATES PATENTS

| Number | Name | Date |
|---|---|---|
| 624,333 | Hixson | May 2, 1899 |
| 698,258 | Closz | Apr. 22, 1902 |
| 721,940 | Closz | Mar. 3, 1903 |
| 2,058,381 | Lindgren | Oct. 20, 1936 |
| 2,253,296 | Holtzman | Aug. 19, 1941 |
| 2,413,382 | Sargent et al. | Dec. 31, 1946 |

FOREIGN PATENTS

| Number | Country | Date |
|---|---|---|
| 13,345 | Great Britain | June 9, 1906 |